US012707277B2

(12) United States Patent
Reeves et al.

(10) Patent No.: US 12,707,277 B2
(45) Date of Patent: Aug. 11, 2026

(54) TERRESTRIAL NETWORK COVERAGE ASSISTED BY NON-TERRESTRIAL COVERAGE

(71) Applicant: T-Mobile USA, Inc., Bellevue, WA (US)

(72) Inventors: Raymond E Reeves, Orlando, FL (US); Simon Youngs, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 288 days.

(21) Appl. No.: 18/409,395

(22) Filed: Jan. 10, 2024

(65) Prior Publication Data

US 2025/0227486 A1 Jul. 10, 2025

(51) Int. Cl.
*H04W 16/18* (2009.01)
*H04W 84/06* (2009.01)

(52) U.S. Cl.
CPC ............ *H04W 16/18* (2013.01); *H04W 84/06* (2013.01)

(58) Field of Classification Search
CPC ........................... H04B 7/18513; H04W 16/18
USPC .......................................................... 455/446
See application file for complete search history.

(56) References Cited

U.S. PATENT DOCUMENTS

2016/0142961 A1 5/2016 Schmidt et al.
2022/0070738 A1 3/2022 Tripathi
2023/0049063 A1 2/2023 Yedan et al.
2023/0061624 A1 3/2023 Kumar et al.
2023/0300674 A1* 9/2023 Kedalagudde ........ H04W 24/02 370/230.1
2024/0381121 A1* 11/2024 Bansal .................. H04W 24/02
2025/0080418 A1* 3/2025 Pathak ................ H04L 41/0836

OTHER PUBLICATIONS

Qualcomm, Inc., "Coverage and Capacity Optimization", 3GPP Draft, R3-212125, vol. RAN WG3, E-Meeting, May 7, 2021, pp. 1-11.
Search Report for European Application No. 25150794.3, Dated Jun. 2, 2025, 18 pages.

* cited by examiner

*Primary Examiner* — Fabricio R Murillo Garcia
(74) *Attorney, Agent, or Firm* — Lee & Hayes, P.C.

(57) ABSTRACT

System and methods for modifying terrestrial coverage devices to provide mobile network coverage using information provided by one or more non-terrestrial coverage devices. Information gathered by one or more NTC devices (e.g., satellites) about user equipment (UE) serviced or detected by the NTC devices may be used by a mobile network to modify one or more characteristics of terrestrial coverage (TC) devices (e.g., base stations). A coverage agent receives UE information gathered about one or more UEs serviced or detected by the NTC device and provides the UE information to a coverage analyzer. The coverage analyzer uses the UE information to determine if partial or full network coverage can be shifted from the NTC device to the TC device by reconfiguring the TC device, potentially offloading some of the workload handled by the NTC device onto the TC device.

20 Claims, 5 Drawing Sheets

COMPUTING DEVICE 500

SYSTEM MEMORY 504

OPERATING SYSTEM 506

PROGRAM MODULE(S) 508

PROGRAM DATA 510

PROCESSING UNIT(S) 502

STORAGE 512

INPUT DEVICE(S) 514

OUTPUT DEVICE(S) 516

COMMUNICATION CONNECTION(S) 518

COVERAGE AGENT(S) 124

COVERAGE ANALYZER 128

OSS 130

TRACE PROCESSOR 126

UE INFORMATION 122

TERRESTRIAL NETWORK COVERAGE ASSISTED BY NON-TERRESTRIAL COVERAGE

BACKGROUND

Systems that provide cellular network coverage have expanded to the use of satellites. Satellites can provide network coverage in areas not serviced or serviced at a relatively low quality of service by terrestrial devices such as network base stations. However, current satellite capabilities may be limited. For example, the distance between a servicing satellite and a user equipment (UE) and/or a network satellite communication interface (i.e., the network component in communication with the satellite) may limit communication capabilities such as bandwidth, responsiveness, and other communication capabilities. Especially in situations in which there is a high demand of services and capabilities, a satellite may not be able to provide the requested or required quality of service.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
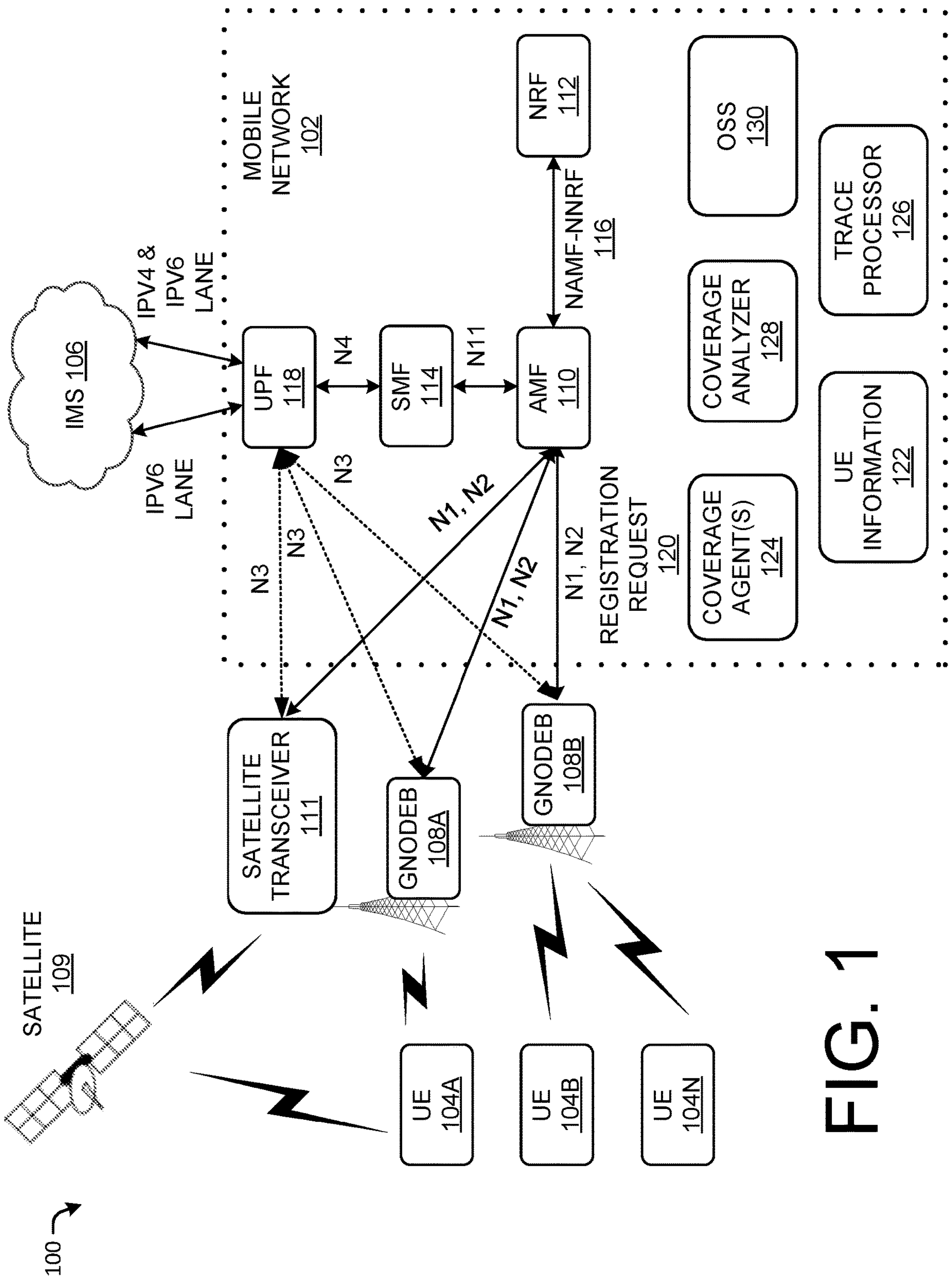
FIG. 1 is a schematic diagram of an illustrative wireless communication network environment in which systems and techniques for scanning user equipment are implemented, in accordance with examples of the disclosure.

This disclosure is directed in part to systems and techniques for modifying terrestrial coverage devices to provide mobile network coverage using information provided by one or more non-terrestrial coverage devices. In some examples of the presently disclosed subject matter, information gathered about one or more UEs serviced or detected by NTC devices (e.g., satellites) may be used by a mobile network to modify one or more characteristics of terrestrial coverage (TC) devices, such as base stations. A coverage agent receives UE information gathered about one or more UEs serviced or detected by NTC devices and provides the UE information to a coverage analyzer. The coverage analyzer receives UE information about one or more UEs from one or more coverage agents. The coverage analyzer uses the UE information to determine if partial or full network coverage can be shifted from the NTC device to the TC device.

For example, a UE may be in communication with an NTC device, whereby the NTC is providing cellular network services to the UE or is otherwise capable of determining various information about the UE even if not providing cellular network services. The NTC device transmits the UE information to a coverage agent of a mobile network serviced in part by the NTC device. The coverage agent transmits the UE information to the coverage analyze to determine if a TC device can handle some or all of the services currently being provided by the NTC device or provide services otherwise not being provided to the UE. For example, an NTC device may be providing cellular services to a UE. The coverage analyzer may determine that the UE information indicates that a base station not in communication with the UE may be able to provide cellular services to the UE if reconfigured. Examples of a reconfiguration include, but are not limited to, increasing transmission power, beam forming (e.g., changing the pitch or direction of the beam) the base station to change the coverage area of the base station to include the area the UE is currently located in, and the like. The mobile network may then reconfigure the TC device to commence providing coverage. In some examples, if more than one TC device may be able to provide coverage, the mobile network may determine the TC device to be used based on various factors such as the amount of power needed to provide coverage, the direction of travel of the UE (e.g., the UE is moving towards one of the TC devices), the current network coverage load of the TC devices, and the like.

In another example, the NTC device may be used to detect and provide coverage for UEs that may potentially lose coverage or may have lost coverage by a TC device. In these examples, the NTC device may be able to detect the UE information, such as location, direction of travel, network service(s) currently being provided, and the like. The NTC device may transmit the UE information to a coverage agent of a mobile network serviced in part by the NTC device. The coverage agent transmits the UE information to the coverage analyze to determine if a TC device can handle some or all of the services currently being provided by the other TC device or is not being handled by any TC device. This configuration may be used in various circumstances such as a UE that is turned on in an area not serviced by any TC device. Because the UE is turned on in an area not serviced by a TC device, the UE may only be registerable by an NTC device. The NTC device may register the UE but, using the UE information, the mobile network may determine that a TC device can be reconfigured to provide coverage to the UE.

Illustrative environments, signal flows, and techniques for modifying terrestrial coverage devices to provide mobile network coverage using information provided by one or more non-terrestrial coverage devices are described below. However, the described systems and techniques may be implemented in other environments.

Illustrative System Architecture

FIG. 1 is a schematic diagram of an illustrative wireless network environment 100 in which the disclosed systems and techniques may be implemented, in accordance with examples of the disclosure. The environment 100 may include a mobile network 102. The mobile network 102 may include various types of networks that support the communication of one or more user equipment 104A-104N (hereinafter referred to generically as "the UE 104," and individually as "the UE 104A," "the UE 104B," and "the UE 104N") using the mobile network 102. It should be noted that although the UE 104 are illustrated as having wireless connections, the UE 104 may be wired and wireless, and may also be part of a network such as an enterprise network (not shown). The UE 104 may be devices such as computer, mobile cellular phones, cellular home Internet devices, and the like. The mobile network 102 may be one or more mobile telecommunication networks that facilitate communications between devices of various types, such as computing device and mobile devices (e.g., UEs). Various connections between devices in the mobile network 102 may be wired, wireless, or a combination thereof. The mobile network 102 may facilitate packet-based communications between the UE 104 and devices on the Internet and/or one or more Internet Protocol Multimedia Systems (IMSs), such as IP multimedia system or subsystem (IMS) 106.

The mobile network 102 may include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which the UE 104 may request and receive access to communicate with network and/or remote devices using any protocol. A UE 104 may access the IMS 106 using protocols such as IPv4 and IPv6. A request for an IPv4v6 communications connection from the device (also known as a "dual stack" connection) may indicate that the UE 104 supports both IPv4 and IPv6. Such a UE 104 may prefer to use IPv6 but is able to use IPv4 in the event that an IPv6 connection is not available.

Communication between the UE 104 and the mobile network 102 may be provided through the use of one or more base stations, represented in FIG. 1 by gNodeB 108A and 108B (hereinafter referred to generically as "the gNodeB 108," and individually as "the gNodeB 108A" and "the gNodeB 108B"). While referred to as a "gNodeB" for explanatory purpose herein, the gNodeB 108 may be any type of base station, including, but not limited to, any type of base transceiver station (BTS), NodeB, eNodeB, gNodeB, and the like. The gNodeB 108 may communicate with other devices and elements in the core of the mobile network 102. The gNodeB 108 is an example of an asset that is installed at a fixed or relatively fixed geographic location to service the UE 104 in the cell provided by the gNodeB 108. Communications between the UE 104 and the mobile network 102 may also be provided by satellite 109. The satellite 109 may be configured to act as a base station, such as the gNodeB 108, or may be configured with additional capabilities. The presently disclosed subject matter is not limited to any particular configuration of the satellite 109. In the example illustrated in FIG. 1, the UE 104B and the UE 104N are being serviced by the gNodeB 108B, while the UE 104A is being serviced by the satellite 109 through a satellite transceiver 111. It should be noted that the satellite 109 may communicate with the mobile network 102 using technologies other than the satellite transceiver 111.

Once the UE 104 has been registered with the mobile network 102, either through the gNodeB 108 or the satellite 109, the UE 104 can access services provided by the IMS 106 through the gNodeB 108 or the satellite 109 by establishing a protocol data unit (PDU) session at the mobile network 102. A PDU session, for example in a 5G network, may be an end-to-end communications session between a device (e.g., the UE 104) and a data network (e.g., the IMS 106). The gNodeB 108 or the satellite 109 may relay or otherwise convey this PDU session request from the UE 104 to an access management function (AMF) 110 in the core of the wireless network in which the gNodeB 108 or the satellite 109 is configured. The AMF 110 may interact with one or more other components to perform the operations needed to establish this session, such as authenticating the device and/or user, registering the UE 104 with the mobile network 102.

The AMF 110, based on receiving this request for the establishment of a PDU, i.e., an IPv4-type or IPv6-type session on behalf of the UE 104, may query a new radio function (NRF) 112 for an address (e.g., IP address) for a session management function (SMF) 114 with which it may interact to establish the requested PDU session. The AMF 110 may exchange SMF discovery communications 116 (Namf-Nnrf), which may be called an SMF address request in some examples, with the NRF 112. The NRF 112 returns the identifier of the SMF 114 for use by the AMF 110. Thereafter, the AMF 110 sends a connection request N11 to the selected SMF 114. In examples, the SMF 114 may provide the access information needed by the UE 104 to communicate with a data network using the established session. The SMF 114 provides this information to the AMF 110 for relay to the gNodeB 108 or the satellite 109 and ultimately to the UE 104 requesting the PDU session. In 5G examples, a message that provides such information may be referred to as a "NIN2MessageTransfer." These and other messages communicating similar information may be referred to generally herein as a "message transfer" messages. The SMF 114 further establishes a connection to its coordinating user plane function (UPF) 118 through an N4 interface, which facilitates communications between the UE 104 and the IMS 106. The SMF 114 generates a connection N3 from the gNodeB 108 or the satellite 109 to the UPF 118 to provide a communication path between the UE 104, through the gNodeB 108 or the satellite 109, and to and from the IMS 106 through either the IPv6 or the IPv4 & IPv6 lane.

As noted above, the satellite 109 may be used by the mobile network 102 to reconfigure one or more gNodeB 108 to provide a cellular service a UE either not currently being serviced by the mobile network 102 (e.g., the UE was turned on in an area not covered by a TC device) or is currently serviced by the satellite 109. In these examples, the satellite 109 may collect and transmit UE information 122 to a coverage agent 124 of the mobile network 102. The UE information 122 may include various information about the UE 104A such as the location of the UE 104A, the speed and/or velocity of the UE 104A, and the like. As noted above, the satellite 109 transmits the UE information 122 to the coverage agent 124. Although a single coverage agent 124 is illustrated, examples of the presently disclosed subject matter may include one or more coverage agents 124 in various locations of the mobile network 102.

In some examples, a trace processor 126 receives the UE information 122 as a trace event prior to, or in coordination with, the coverage agent 124 receiving the UE information 122. The trace processor 126 may receive the UE information 122 first and can be used to determine if the trace event (i.e., the UE information 122 received from the satellite 109) is to be sent to the coverage agent 124. In some examples, the trace processor 126 acts as an initial filter to reduce a workload on the coverage agent 124. The trace processor 126 can be used because not all the UE information 122 received from the satellite 109 may be related to potentially changing the coverage from the satellite 109 to one or more of the gNodeBs 108. For example, the UE information 122 may be information related to user identity, call connection information (e.g., when a call was connected and to whom the call was connected), and the like. The UE information 122 that the trace processor 126 may determine should be provided to the coverage agent 124 includes, but is not limited to, the location of the UE 104A, the speed and/or velocity of the UE 104A, the types of services being provided by the satellite 109, the bandwidth or load on the satellite 109 from the UE 104A and other UEs being serviced by the satellite 109, and the like.

In some examples, upon the trace processor 126 determining that the UE information 122 should be provided to the cover agent 124, the trace processor 126 transmits the UE information 122 to the coverage agent 124. As noted above, in some examples, the coverage agent 124 may be one or more coverage agents 124 distributed in the mobile network 102, acting as a data collection and transmission module of the UE information 122 to a coverage analyzer 128. The coverage analyzer 128 receives the UE information 122 and determines if a modification or reconfiguration of one or more of the TC devices, e.g., the gNodeBs 108, is required or desired based on the UE information 122.

The coverage analyzer 128 queries an operations support system (OSS) 130. The OSS 130 has access to information relating to the current configuration of the gNodeBs 108 as well as other assets of the mobile network 102. A purpose of the query from the coverage analyzer 128 to the OSS 130 is to determine, based on the UE information 122, if one of the gNodeBs 108 may be reconfigured to provide partial or full cellular service coverage to the UE 104. For example, the UE 104 may be just out of coverage of the gNodeB 108A but may be able to cover (i.e., provide cellular service) the UE 104 if, for example, the transmission power output of the gNodeB 108A is increased, the pitch/direction of the beam of the gNodeB 108A is adjusted in the direction of the UE 104, the workload of the gNodeB 108A is low enough to add the workload of the UE 104 currently being handled by the satellite 109, the workload of the gNodeB 108A is shifted to the gNodeB 108B to allow the gNodeB 108A to handle the workload of the UE 104, and the like.

Upon determining that all or a portion of the workload of the satellite 109 for the UE 104 may be shifted to the gNodeB 108A if the gNodeB 108A is reconfigured, the coverage analyzer 128 transmits a further query to the OSS 130 to have the OSS 130 send configuration changes to the gNodeB 108A to allow the gNodeB 108A to commence servicing the UE 104. Once reconfigured, the gNodeB 108A transmits a service broadcast and, if received by the UE 104, the UE 104 commences the registration process with the gNodeB 108A to allow the gNodeB 108A to commence or take over the workload of the UE 104.

Illustrative Signal Flows

Figure 2:
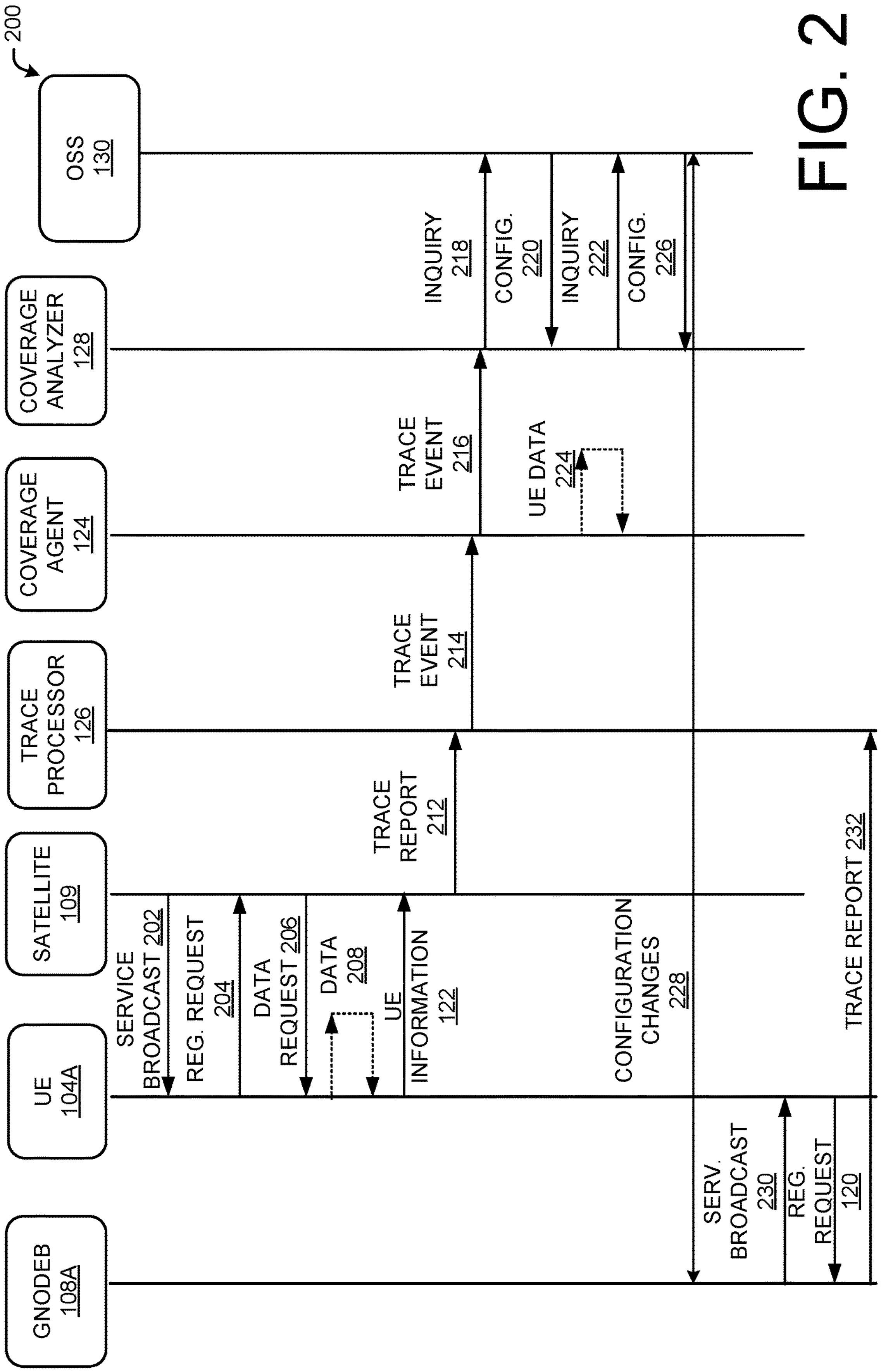
FIG. 2 is an example signal flow diagram for updating a location of a mobile network asset, in accordance with examples of the disclosure.

FIG. 2 illustrates an exemplary signal flow 200 of various messages that may be exchanged in one or more of the disclosed systems and techniques for modifying terrestrial coverage devices to provide mobile network coverage using information provided by one or more non-terrestrial coverage devices, in accordance with examples of the disclosure. Reference may be made in this description of the signal flow 200 to devices, entities, and interfaces illustrated in FIG. 1 and described in regard to that figure. However, the operations, signals, and signal flow illustrated in FIG. 2 and described herein may be implemented in any suitable system and/or with any one or more suitable devices and/or entities. Moreover, any of the operations, signals, and/or entities described in regard to FIG. 2 may be used separately and/or in conjunction with other operations, signals, and/or entities. All such embodiments are contemplated as within the scope of the instant disclosure.

In FIG. 2, the satellite 109, acting as a base station in a manner similar to the gNodeBs 108, transmits a service broadcast 202 to the coverage area of the satellite 109. The coverage area of the satellite 109 may be limited to a particular area or may be dependent on the power of the satellite 109. The presently disclosed subject matter is not limited to any particular manner in which the coverage area of the satellite 109 is determined. The UE 104A receives the service broadcast 202 and commences a registration process by transmitting a registration request 204 to the satellite 109. As noted above, the mobile network 102 may use TC devices to handle some or all of the workload of the satellite 109 for the UE 104A. To commence or shift the workload, the mobile network 102 may determine which TC devices may be able to handle all or part of the workload of the UE 104A. In order to do that, the UE information 210 is generated. In some examples, the satellite 109 transmits a data request 206 to the UE 104A. The data request 206 can include instructions to collect data 208 and transmit that data to the satellite 109. The data 208 can include, but is not limited to, location, direction of travel, battery life or condition, and the like.

The satellite 109 receives the data 208 and transmits the data 208 as the UE information 122 to the trace processor 126 as a trace report 212. In some examples, as described above, the mobile network 102 may use the trace processor 126 prior to the coverage agent 124 receiving the UE information 122. The trace processor 126 may receive the UE information 122 first and can be used to determine if the trace report 212 is to be sent to the coverage agent 124. In some examples, the trace processor 126 acts as an initial filter to reduce a workload on the coverage agent 124. The trace processor 126 can be used because not all the UE information 122 received from the satellite 109 may be related to potentially changing the coverage from the satellite 109 to one or more of the gNodeBs 108. For example, the UE information 122 may be information related to user identity, call connection information (e.g., when a call was connected and to whom the call was connected), and the like. The UE information 122 that the trace processor 126 may determine should be provided to the coverage agent 124 includes, but is not limited to, the location of the UE 104A, the speed and/or velocity of the UE 104A, the types of services being provided by the satellite 109, the bandwidth or load on the satellite 109 from the UE 104A and other UEs being serviced by the satellite 109, and the like.

Upon determining that the trace report 212 is to be transmitted to the coverage agent 124, the trace processor 126 transmits the UE information 122 in a trace event 214 to the coverage agent 124, which transmits a trace event 216 to the coverage analyzer 128. In some examples, along with the UE information 122, the trace events 214 and 216 include information about the systems and/or components servicing the UE 104A. This information can include information about the satellite 109 such as, but not limited to, the location of the satellite 109, the coverage area of the satellite 109, the workload or bandwidth capacity of the satellite 109, the current usage of the workload or bandwidth capacity of the satellite 109, and the like.

To determine if the mobile network 102 is to be reconfigured based on the trace event 216, the coverage analyzer 128 transmits inquiry 218 to the OSS 130. The inquiry 218 is a request for current state information of the assets of the mobile network 102, such as the gNodeB 108A, that may be able to provide service to the UE 104A. The OSS 130 transmits the configuration 220 to the coverage analyzer 128. In some examples, as the coverage analyzer 128 is determining whether or not the mobile network 102 is to be reconfigured, the coverage agent 124 is updating the UE data 208 with UE data 224 and providing that updated information to the coverage analyzer 128 in the trace event 216 message. It should be noted that in some configurations, the UE data 224 may be updated periodically or may not be used. For example, if the UE 104A is detected to have a low battery charge or condition, the UE data 224 may cease to be collected to conserve the battery of the UE 104A. The coverage analyzer 128 transmits a second inquiry 222 and is provided with configuration information 226 from the OSS 130 of the manner in which the mobile network 102 is to be reconfigured. To reconfigure the gNodeB 108A, the OSS 130 transmits configuration changes 228 to the gNodeB 108A. Once reconfigured, the gNodeB 108A transmits a service broadcast message 230 to the UE 104A, whereby the UE 104A commences the registration process by transmitting a registration request 120 to the gNodeB 108A. The gNodeB 108A thereafter transmits a trace report 232 to the trace processor 126 to inform the trace processor 126 that the UE 104A is registered on the gNodeB 108A.

Illustrative Operations

Figure 3:
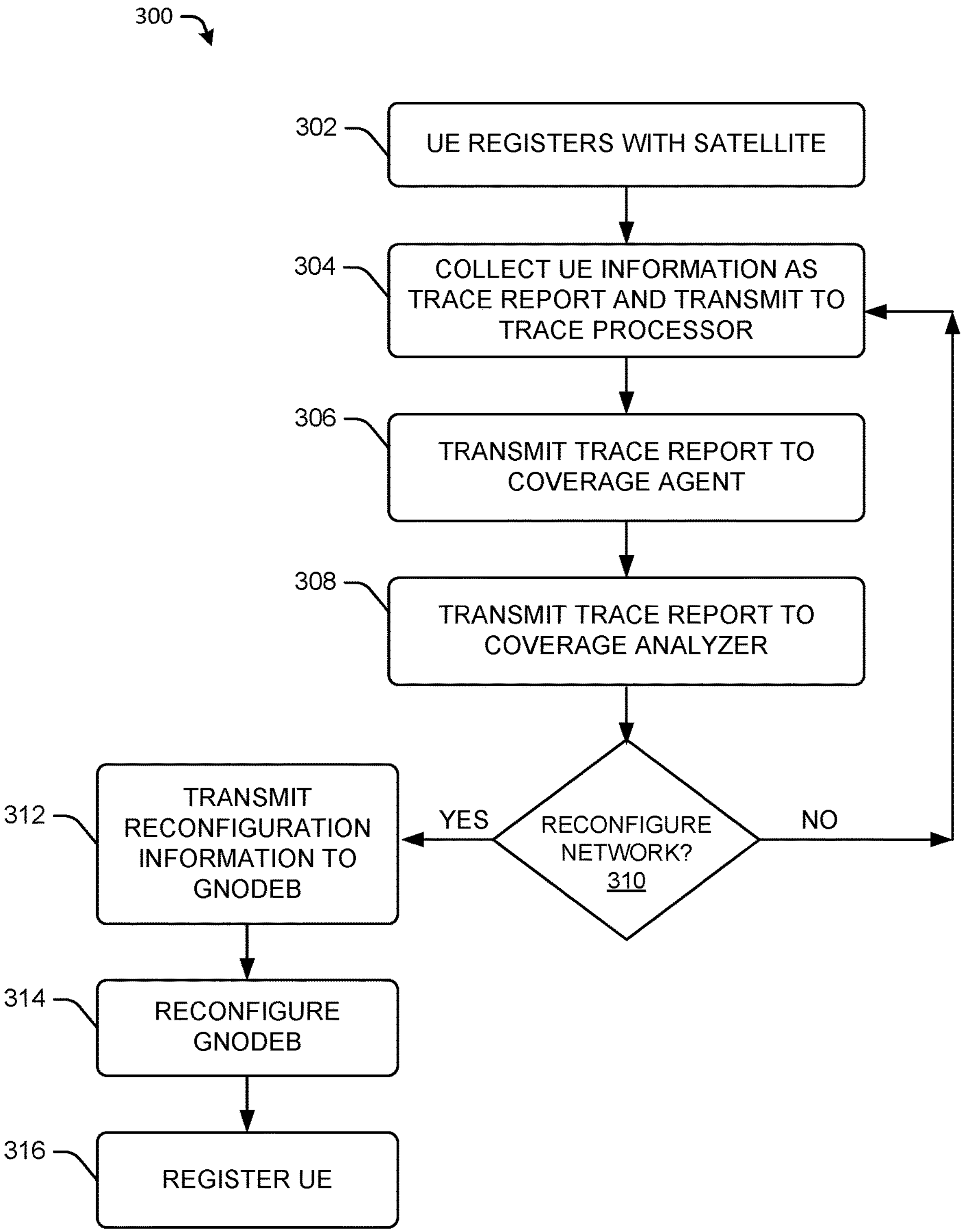
FIG. 3 is a flow diagram of an illustrative process for updating a location of a mobile network asset, in accordance with examples of the disclosure.

FIG. 3 shows a flow diagram of an illustrative process 300 for modifying terrestrial coverage devices to provide mobile network coverage using information provided by one or more non-terrestrial coverage devices, in accordance with examples of the disclosure. The process 300 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 may be described with reference to the wireless network environment 100 of FIG. 1, however other environments may also be used.

At block 302, the UE 104A registers with the satellite 109. The satellite 109, acting as a base station in a manner similar to the gNodeBs 108, transmits a service broadcast 202 to the coverage area of the satellite 109. The UE 104A receives the service broadcast 202 and commences the registration process by transmitting a registration request 204 to the satellite 109. The UE 104A is thereafter registered on the mobile network 102 through the satellite 109.

At block 304, the trace processor 126 commences the collection of UE 104A data 208 to commence the process of potentially reconfiguring the gNodeB 108A to shift some or all of the workload the satellite 109 is handling for the UE 104A. In some examples, the satellite 109 transmits a data request 206 to the UE 104A. The data request 206 can include instructions to collect data 208 and transmit that data to the satellite 109. The data 208 can include, but is not limited to, location, direction of travel, battery life, and the like. The satellite 109 receives the data 208 and transmits the data 208 as the UE information 122 to the trace processor 126 as a trace report 212.

At block 306, the trace processor 126 transmits the trace event 214 to the coverage agent 124. In some examples, along with the UE information 122, the trace events 214 and 216 include information about the systems and/or components servicing the UE 104A. This information can include information about the satellite 109 such as, but not limited to, the location of the satellite 109, the coverage area of the satellite 109, the workload or bandwidth capacity of the satellite 109, the current usage of the workload or bandwidth capacity of the satellite 109, and the like.

At block 308, the trace agent 124 transmits the trace event 216 to the coverage analyzer 128. The trace event 216 may include the information in the trace event 214 as well as updated UE data 224.

At block 310, the coverage analyzer 128 determines if the mobile network 102 is to be reconfigured. To determine if the mobile network 102 is to be reconfigured based on the trace event 216, the coverage analyzer 128 transmits inquiry 218 to the OSS 130. The inquiry 218 is a request for current state information of the assets of the mobile network 102, such as the gNodeB 108A, that may be able to provide service to the UE 104A. The OSS 130 transmits the configuration 220 to the coverage analyzer 128. In some examples, as the coverage analyzer 128 is determining whether or not the mobile network 102 is to be reconfigured, the coverage agent 124 is updating the UE data 208 with UE data 224 and providing that updated information to the coverage analyzer 128 in the trace event 216 message. It should be noted that in some configurations, the UE data 224 may be updated periodically or may not be used. For example, if the UE 104A is detected to have a low battery, the UE data 224 may cease to be collected to conserve the battery of the UE 104A. The coverage analyzer 128 transmits a second inquiry 222 and is provided with configuration information 226 from the OSS 130 of the manner in which the mobile network 102 is to be reconfigured.

If at block 310 the coverage analyzer 128 determines that the mobile network 102 is not to be reconfigured, the process 300 continues to block 304. If at block 310, the coverage analyzer 128 determines that the mobile network 102 is to be reconfigured, at block 312, the OSS 130 transmits configuration changes 228 to the gNodeB 108A.

At block 314, the gNodeB 108A is reconfigured using the configuration changes 228 received from the OSS 130. Once reconfigured, the gNodeB 108A transmits a service broadcast message 230 to the UE 104A. At block 316, the UE 104A commences the registration process by transmitting a registration request 120 to the gNodeB 108A. The gNodeB 108A thereafter transmits a trace report 232 to the trace processor 126 to inform the trace processor 126 that the UE 104A is registered on the gNodeB 108A.

Example User Equipment

Figure 4:
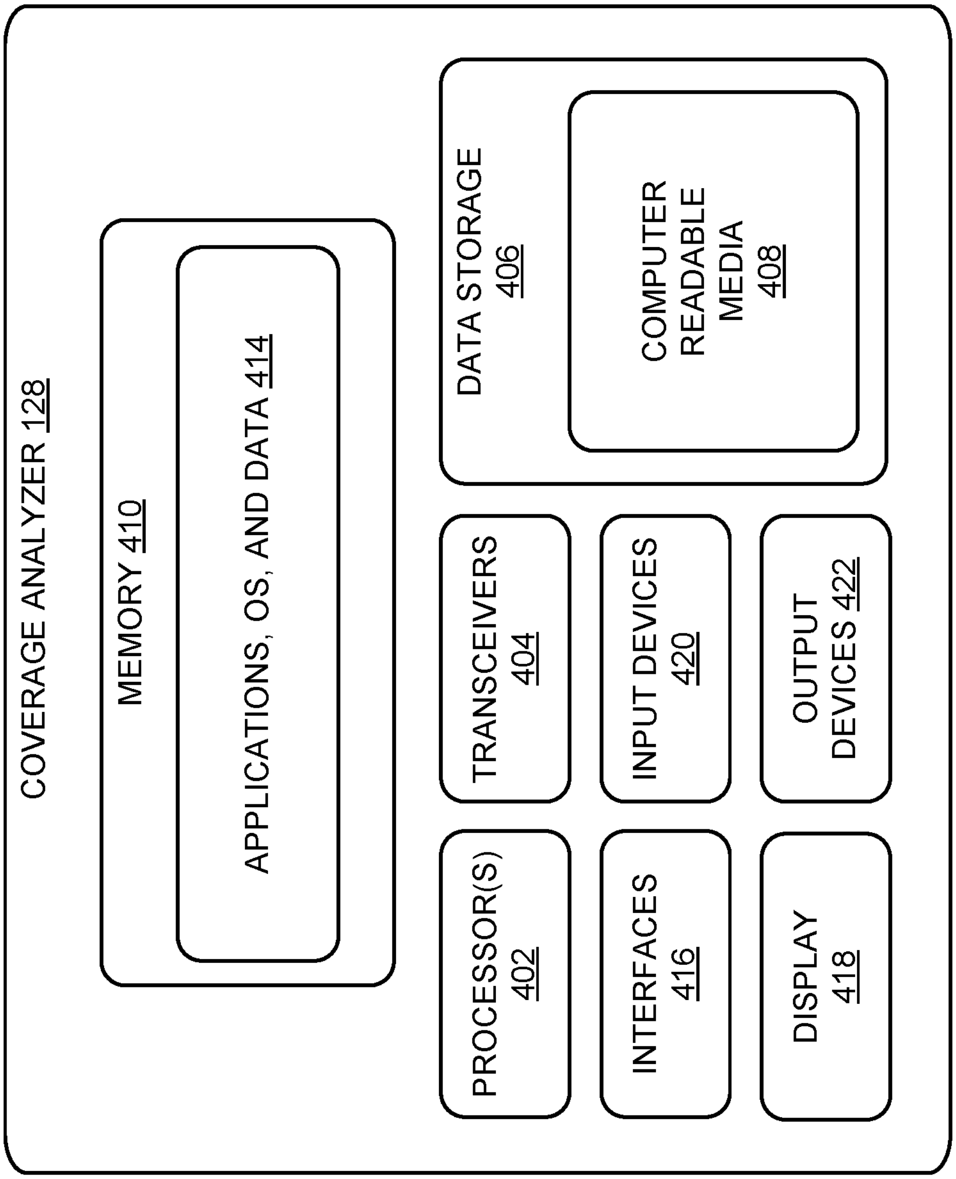
FIG. 4 is a schematic diagram of illustrative components in an example user device that is configured for updating a location of a mobile network asset, in accordance with examples of the disclosure.

FIG. 4 is an example of the coverage analyzer 128 for use with the systems and methods disclosed herein, in accordance with some examples of the present disclosure. The coverage analyzer 128 may include one or more processors 402, one or more transmit/receive antennas (e.g., transceivers or transceiver antennas) 404, and a data storage 406. The data storage 406 may include a computer readable media 408 in the form of memory and/or cache. This computer-readable media may include a non-transitory computer-readable media. The processor(s) 402 may be configured to execute instructions, which can be stored in the computer readable media 408 and/or in other computer readable media accessible to the processor(s) 402. In some configurations, the processor(s) 402 is a Central Processing Unit (CPU), a Graphics Processing Unit (GPU), or both CPU and GPU, or any other sort of processing unit. The transceiver antenna(s) 404 can exchange signals with a base station, such as gNodeB 108, or a satellite such as the satellite 109.

The coverage analyzer 128 may be configured with a memory 410. The memory 410 may be used to store the trace event 216, the configuration 220, and/or the configuration information 226. The memory 410 may be implemented within, or separate from, the data storage 406 and/or the computer readable media 408. The memory 410 may include any available physical media accessible by a computing device to implement the instructions stored thereon. For example, the memory 410 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information, and which may be accessed by the coverage analyzer 128.

The memory 410 can store several modules, such as instructions, data stores, and so forth that are configured to execute on the processor(s) 402. In configurations, the memory 410 may also store one or more applications 414 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the gNodeB 108). The applications 414 may further include applications to determine if the mobile network 102 is to be reconfigured. The applications 414 may also include one or more operating systems and/or one or more third-party applications that provide additional functionality to the coverage analyzer 128.

Although not all illustrated in FIG. 4, the coverage analyzer 128 may also comprise various other components, e.g., a battery, a charging unit, one or more network interfaces 416, an audio interface, a display 418, a keypad or keyboard, and one or more input devices 420, and one or more output devices 422.

Example Computing Device

Figure 5:
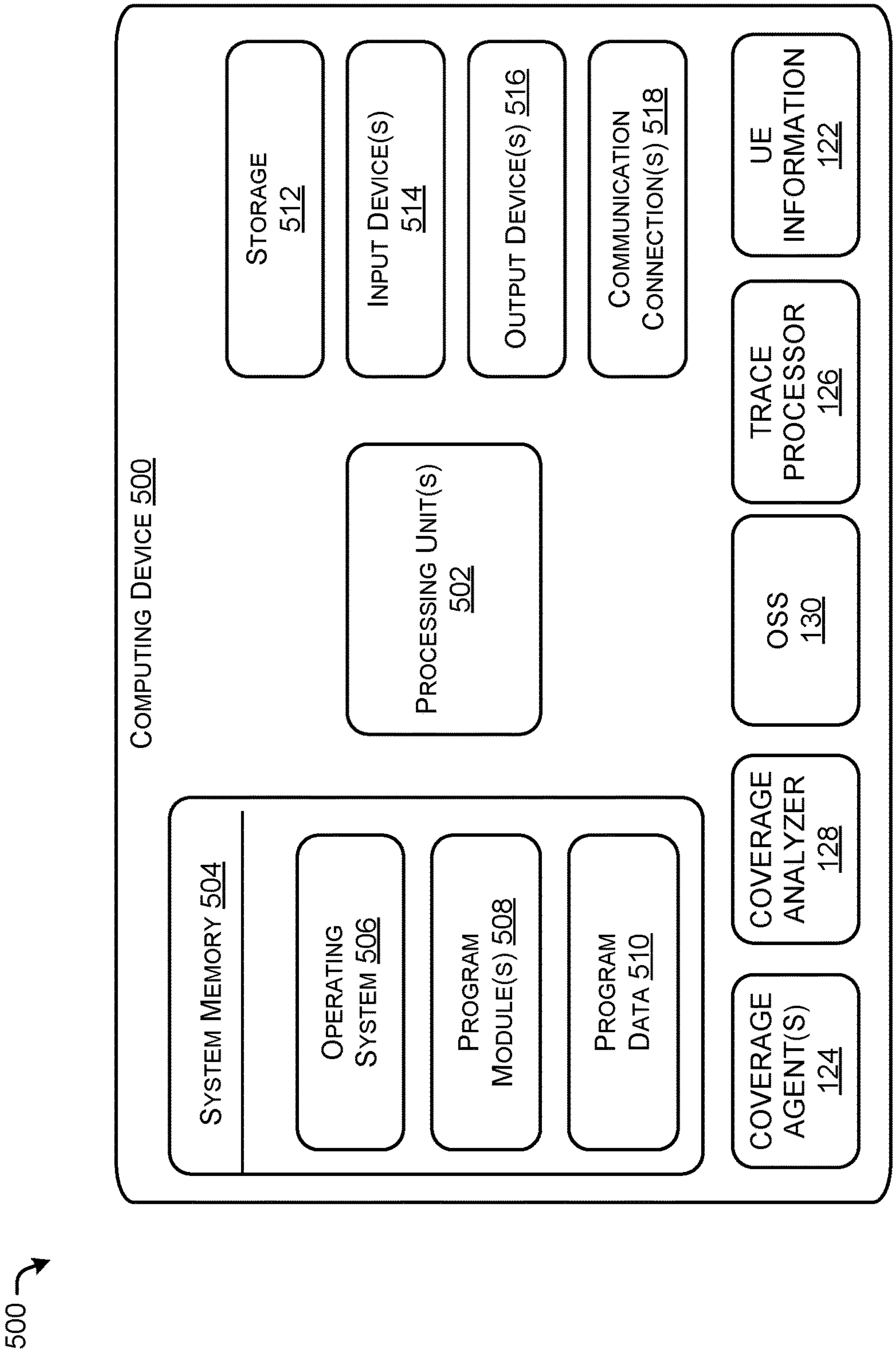
FIG. 5 is a schematic diagram of illustrative components in an example computing device that is configured for updating a location of a mobile network asset, in accordance with examples of the disclosure.

FIG. 5 is an example of a computing device 500 for use with the systems and methods disclosed herein, in accordance with some examples of the present disclosure. The computing device 500 can be used to implement various components of a core network, a base station, and/or any servers, routers, gateways, gateway elements, administrative components, etc. that can be used by a communication provider. The computing device 500 can further be used to implement the mobile network 102, the coverage agent(s) 124, the coverage analyzer 128, the OSS 130, and/or the trace processor 126.

In various embodiments, the computing device 500 can include one or more processing units 502 and system memory 504. Depending on the exact configuration and type of computing device, the system memory 504 can be volatile (such as RAM), non-volatile (such as ROM, flash memory, etc.) or some combination of the two. The system memory 504 can include an operating system 506, one or more program modules 508, and can include program data 510. The system memory 504 may be secure storage or at least a portion of the system memory 504 can include secure storage. The secure storage can prevent unauthorized access to data stored in the secure storage. For example, data stored in the secure storage can be encrypted or accessed via a security key and/or password. The program modules can include instructions to execute the coverage agent(s) 124, the coverage analyzer 128, the OSS 130, and/or the trace processor 126 of FIG. 1.

The computing device 500 can also include additional data storage devices (removable and/or non-removable) such as, for example, magnetic disks, optical disks, or tape. Such additional storage is illustrated in FIG. 5 by storage 512.

Non-transitory computer storage media of the computing device 500 can include volatile and nonvolatile, removable and non-removable media implemented in any method or technology for storage of information, such as computer readable instructions, data structures, program modules, or other data. The system memory 504 and storage 512 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by computing device 500. Any such non-transitory computer readable storage media can be part of the computing device 500.

In various embodiment, any or all of the system memory 504 and storage 512 can store programming instructions which, when executed, implement some or all of the functionality described above as being implemented by one or more systems configured in the environment 100 and/or components of the mobile network 102.

The computing device 500 can also have one or more input devices 514 such as a keyboard, a mouse, a touch-sensitive display, voice input device, etc. The computing device 500 can also have one or more output devices 516 such as a display, speakers, a printer, etc. can also be included. The computing device 500 can also contain one or more communication connections 518 that allow the device to communicate with other computing devices using wired and/or wireless communications, including, but not limited to, the satellite transceiver 111.

Example Clauses

The following paragraphs describe various examples. Any of the examples in this section may be used in combination (s) with any other of the examples in this section and/or any of the other examples or embodiments described herein.

A: All methods, systems, and apparatuses, including all equivalents and combinations, disclosed herein.

Clause 1. A method, comprising: receiving, by a trace processor of a mobile network, user equipment information of a user equipment in communication with a satellite, wherein the satellite is configured to receive the user equipment information from the user equipment, and wherein the satellite is further configured to provide a cellular service of the mobile network for the user equipment; transmitting, by the trace processor, the user equipment information to a coverage agent of the mobile network as a trace event; transmitting, by the coverage agent, the trace event to a coverage analyzer; determining, by the coverage analyzer, if an asset of the mobile network is to be reconfigured based on the trace event; upon determining, by the coverage analyzer, that the asset of the mobile network is not to be reconfigured, continue receiving, by the trace processor of the mobile network, the user equipment information of the user equipment in communication with the satellite; or upon determining, by the coverage analyzer, that the asset of the mobile network is to be reconfigured, causing the mobile network to generate a configuration change to reconfigure the asset of the mobile network to provide the cellular service; and reconfiguring the asset to provide the cellular service.

Clause 2. The method of clause 1, further comprising registering the user equipment on the mobile network at the asset.

Clause 3. The method of clause 1, wherein the asset comprises a base station, and wherein reconfiguring the asset to provide the cellular service comprises increasing a transmission power output of the base station, beam forming a transmission of the base station by modifying a pitch and/or direction of the transmission to a direction of the user equipment.

Clause 4. The method of clause 1, wherein the user equipment information comprises a location of the user equipment or a velocity of travel of the user equipment.

Clause 5. The method of clause 1, wherein the user equipment information comprises a user identity, one or more services of the satellite being used by the user equipment, or a battery condition of the user equipment.

Clause 6. The method of clause 1, wherein determining, by the coverage analyzer, if the asset of the mobile network is to be reconfigured based on the trace event comprises: transmitting, by the coverage analyzer, an inquiry to an operations support system of the mobile network, wherein the operations support system is configured to have access to current state information of the asset and a plurality of second assets of the mobile network, wherein the state information comprises an availability and bandwidth usage of the asset and the plurality of second assets of the mobile network; transmitting, by the operations support system, a configuration message to the coverage analyzer, wherein the configuration message comprises the current state information of the asset and a plurality of second assets of the mobile network; and transmitting, by the operations support system, the configuration change to reconfigure the asset of the mobile network.

Clause 7. The method of clause 6, further comprising updating, by the coverage agent, the user equipment information.

Clause 8. The method of clause 1, further comprising shifting the cellular service from the satellite to the asset.

Clause 9. The method of clause 1, wherein the user equipment initially is not in coverage of the asset of the mobile network.

Clause 10. A non-transitory computer-readable media storing computer-executable instructions that, when executed by one or more processors, cause the one or more processors to perform operations comprising: receiving, by a trace processor of a mobile network, user equipment information of a user equipment in communication with a satellite, wherein the satellite is configured to receive the user equipment information from the user equipment, and wherein the satellite is further configured to provide a cellular service of the mobile network for the user equipment; transmitting, by the trace processor, the user equipment information to a coverage agent of the mobile network as a trace event; transmitting, by the coverage agent, the trace event to a coverage analyzer; determining, by the coverage analyzer, if an asset of the mobile network is to be reconfigured based on the trace event; upon determining, by the coverage analyzer, that the asset of the mobile network is not to be reconfigured, continue receiving, by the trace processor of the mobile network, the user equipment information of the user equipment in communication with the satellite; or upon determining, by the coverage analyzer, that the asset of the mobile network is to be reconfigured, causing the mobile network to generate a configuration change to reconfigure the asset of the mobile network to provide the cellular service; and reconfiguring the asset to provide the cellular service.

Clause 11. The non-transitory computer-readable media of clause 10, wherein the computer-executable instructions that, when executed by the one or more processors, cause the one or more processors to perform operations comprising registering the user equipment on the mobile network at the asset.

Clause 12. The non-transitory computer-readable media of clause 10, wherein the asset comprises a base station, and wherein reconfiguring the asset to provide the cellular service comprises increasing a transmission power output of the base station, beam forming a transmission of the base station by modifying a pitch and/or direction of the transmission to a direction of the user equipment, wherein the user equipment information comprises a location of the user equipment or a velocity of travel of the user equipment.

Clause 13. The non-transitory computer-readable media of clause 12, wherein the user equipment information further comprises a user identity, one or more services of the satellite being used by the user equipment, or a battery condition of the user equipment.

Clause 14. The non-transitory computer-readable media of clause 10, further comprising computer-executable instructions that, when executed by the one or more processors, cause the one or more processors to perform operations comprising: transmitting, by the coverage analyzer, an inquiry to an operations support system of the mobile network, wherein the operations support system is configured to have access to current state information of the asset and a plurality of second assets of the mobile network, wherein the state information comprises an availability and bandwidth usage of the asset and the plurality of second assets of the mobile network; transmitting, by the operations support system, a configuration message to the coverage analyzer, wherein the configuration message comprises the current state information of the asset and a plurality of second assets of the mobile network; and transmitting, by the operations support system, the configuration change to reconfigure the asset of the mobile network.

Clause 15. The non-transitory computer-readable media of clause 14, further comprising computer-executable instructions that, when executed by the one or more processors, cause the one or more processors to perform operations comprising updating, by the coverage agent, the user equipment information.

Clause 16. The non-transitory computer-readable media of clause 10, wherein the computer-executable instructions that, when executed by the one or more processors, cause the one or more processors to perform operations comprising shifting the cellular service from the satellite to the asset.

Clause 17. The non-transitory computer-readable media of clause 10, wherein the user equipment initially is not in coverage of the asset of the mobile network.

Clause 18. A network, comprising: a memory storing computer-executable instructions; and a processor in communication with the memory, the computer-executable instructions causing the processor to perform acts comprising: receiving, by a trace processor of a mobile network, user equipment information of a user equipment in communication with a satellite, wherein the satellite is configured to receive the user equipment information from the user equipment, and wherein the satellite is further configured to provide a cellular service of the mobile network for the user equipment; transmitting, by the trace processor, the user equipment information to a coverage agent of the mobile network as a trace event; transmitting, by the coverage agent, the trace event to a coverage analyzer; determining, by the coverage analyzer, if an asset of the mobile network is to be reconfigured based on the trace event; upon determining, by the coverage analyzer, that the asset of the mobile network is not to be reconfigured, continue receiving, by the trace processor of the mobile network, the user equipment information of the user equipment in communication with the satellite; or upon determining, by the coverage analyzer, that the asset of the mobile network is to be reconfigured, causing the mobile network to generate a configuration change to reconfigure the asset of the mobile network to provide the cellular service; and reconfiguring the asset to provide the cellular service.

Clause 19. The network of clause 18, wherein the asset comprises a base station, and wherein reconfiguring the asset to provide the cellular service comprises increasing a transmission power output of the base station, beam forming a transmission of the base station by modifying a pitch and/or direction of the transmission to a direction of the user equipment.

Clause 20. The network of clause 18, wherein the user equipment information comprises a location of the user equipment, a velocity of travel of the user equipment, a user identity, one or more services of the satellite being used by the user equipment, or a battery condition of the user equipment.

While the example clauses described above are described with respect to one particular implementation, it should be understood that, in the context of this document, the content of the example clauses can also be implemented via a method, device, system, computer-readable medium, and/or another implementation. Additionally, any of the examples A-S can be implemented alone or in combination with any other one or more of the examples A-S.

Conclusion

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method, comprising:

receiving, by a trace processor of a mobile network, user equipment information of a user equipment in communication with a satellite, wherein the satellite is configured to receive the user equipment information from the user equipment, and wherein the satellite is further configured to provide a cellular service of the mobile network for the user equipment;

transmitting, by the trace processor, the received user equipment information to a coverage agent of the mobile network as a trace event;

transmitting, by the coverage agent, the trace event to a coverage analyzer;

determining, by the coverage analyzer, that an asset of the mobile network is to be reconfigured based on the trace event;

upon determining, by the coverage analyzer, that the asset of the mobile network is to be reconfigured, causing the mobile network to generate a configuration change to reconfigure the asset of the mobile network to provide the cellular service; and reconfiguring the asset to provide the cellular service.

2. The method of claim 1, further comprising registering the user equipment on the mobile network at the asset.

3. The method of claim 1, wherein the asset comprises a base station, and wherein reconfiguring the asset to provide the cellular service comprises increasing a transmission power output of the base station, beam forming a transmission of the base station by modifying a pitch and/or direction of the transmission to a direction of the user equipment.

4. The method of claim 1, wherein the user equipment information comprises a location of the user equipment or a velocity of travel of the user equipment.

5. The method of claim 1, wherein the user equipment information comprises a user identity, one or more services of the satellite being used by the user equipment, or a battery condition of the user equipment.

6. The method of claim 1, wherein the determining, by the coverage analyzer, that the asset of the mobile network is to be reconfigured based on the trace event comprises:

transmitting, by the coverage analyzer, an inquiry to an operations support system of the mobile network, wherein the operations support system is configured to have access to state information of the asset and a plurality of second assets of the mobile network, wherein the state information comprises an availability and bandwidth usage of the asset and the plurality of second assets of the mobile network;

transmitting, by the operations support system, a configuration message to the coverage analyzer, wherein the configuration message comprises the current state information of the asset and the plurality of second assets of the mobile network; and transmitting, by the operations support system, the configuration change to reconfigure the asset of the mobile network.

7. The method of claim 6, further comprising updating, by the coverage agent, the user equipment information.

8. The method of claim 1, further comprising shifting the cellular service from the satellite to the asset.

9. The method of claim 1, wherein the user equipment initially is not in coverage of the asset of the mobile network.

10. A non-transitory computer-readable media storing computer-executable instructions that, when executed by one or more processors, cause the one or more processors to perform operations comprising:

receiving, by a trace processor of a mobile network, user equipment information of a user equipment in communication with a satellite, wherein the satellite is configured to receive the user equipment information from the user equipment, and wherein the satellite is further configured to provide a cellular service of the mobile network for the user equipment;

transmitting, by the trace processor, the received user equipment information to a coverage agent of the mobile network as a trace event;

transmitting, by the coverage agent, the trace event to a coverage analyzer;

determining, by the coverage analyzer, that an asset of the mobile network is to be reconfigured based on the trace event;

upon determining, by the coverage analyzer, that the asset of the mobile network is to be reconfigured, causing the mobile network to generate a configuration change to reconfigure the asset of the mobile network to provide the cellular service; and reconfiguring the asset to provide the cellular service.

11. The non-transitory computer-readable media of claim 10, wherein the computer-executable instructions that, when executed by the one or more processors, cause the one or more processors to perform further operations comprising registering the user equipment on the mobile network at the asset.

12. The non-transitory computer-readable media of claim 10, wherein the asset comprises a base station, and wherein reconfiguring the asset to provide the cellular service comprises increasing a transmission power output of the base station, beam forming a transmission of the base station by modifying a pitch and/or direction of the transmission to a direction of the user equipment, wherein the user equipment information comprises a location of the user equipment or a velocity of travel of the user equipment.

13. The non-transitory computer-readable media of claim 12, wherein the user equipment information further comprises a user identity, one or more services of the satellite being used by the user equipment, or a battery condition of the user equipment.

14. The non-transitory computer-readable media of claim 10, comprising further computer-executable instructions that, when executed by the one or more processors, cause the one or more processors to perform further operations comprising:

transmitting, by the coverage analyzer, an inquiry to an operations support system of the mobile network, wherein the operations support system is configured to have access to state information of the asset and a plurality of second assets of the mobile network, wherein the state information comprises an availability and bandwidth usage of the asset and the plurality of second assets of the mobile network;

transmitting, by the operations support system, a configuration message to the coverage analyzer, wherein the configuration message comprises the current state information of the asset and the plurality of second assets of the mobile network; and transmitting, by the operations support system, the configuration change to reconfigure the asset of the mobile network.

15. The non-transitory computer-readable media of claim 10, comprising further computer-executable instructions that, when executed by the one or more processors, cause the one or more processors to perform further operations comprising updating, by the coverage agent, the user equipment information.

16. The non-transitory computer-readable media of claim 10, wherein the computer-executable instructions that, when executed by the one or more processors, cause the one or more processors to perform further operations comprising shifting the cellular service from the satellite to the asset.

17. The non-transitory computer-readable media of claim 10, wherein the user equipment initially is not in coverage of the asset of the mobile network.

18. A network, comprising:

a memory storing computer-executable instructions; and a processor in communication with the memory, the computer-executable instructions causing the processor to perform acts comprising:

receiving, by a trace processor of a mobile network, user equipment information of a user equipment in communication with a satellite, wherein the satellite is configured to receive the user equipment information from the user equipment, and wherein the satellite is further configured to provide a cellular service of the mobile network for the user equipment;

transmitting, by the trace processor, the received user equipment information to a coverage agent of the mobile network as a trace event;

transmitting, by the coverage agent, the trace event to a coverage analyzer;

determining, by the coverage analyzer, that an asset of the mobile network is to be reconfigured based on the trace event;

upon determining, by the coverage analyzer, that the asset of the mobile network is to be reconfigured, causing the mobile network to generate a configuration change to reconfigure the asset of the mobile network to provide the cellular service; and reconfiguring the asset to provide the cellular service.

19. The network of claim 18, wherein the asset comprises a base station, and wherein reconfiguring the asset to provide the cellular service comprises increasing a transmission power output of the base station, beam forming a transmission of the base station by modifying a pitch and/or direction of the transmission to a direction of the user equipment.

20. The network of claim 18, wherein the user equipment information comprises a location of the user equipment, a velocity of travel of the user equipment, a user identity, one or more services of the satellite being used by the user equipment, or a battery condition of the user equipment.

* * * * *